United States Patent
Kothandaraman et al.

(10) Patent No.: US 10,331,693 B1
(45) Date of Patent: Jun. 25, 2019

(54) FILTERS AND EVENT SCHEMA FOR CATEGORIZING AND PROCESSING STREAMING EVENT DATA

(71) Applicant: Amazon Technologies, Inc., Seattle, WA (US)

(72) Inventors: Raghunathan Kothandaraman, Redmond, WA (US); Deep Dixit, Kota (IN); Gaurav Gupta, Bangalore (IN); Sasanka Rajaram, Bangalore (IN); Ankit Kumar, Seattle, WA (US); Mark Aran Aiken, Seattle, WA (US); Dhaval Parmar, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 238 days.

(21) Appl. No.: 15/262,744

(22) Filed: Sep. 12, 2016

(51) Int. Cl.
- *G06F 16/25* (2019.01)
- *G06F 16/84* (2019.01)
- *G06F 16/21* (2019.01)

(52) U.S. Cl.
CPC .......... *G06F 16/258* (2019.01); *G06F 16/212* (2019.01); *G06F 16/84* (2019.01)

(58) Field of Classification Search
CPC ......... G06F 17/30569; G06F 17/30294; G06F 17/30914; G06F 16/258; G06F 16/212; G06F 16/84
USPC .......................................................... 707/756
See application file for complete search history.

(56) References Cited

U.S. PATENT DOCUMENTS

| | | | | |
|---|---|---|---|---|
| 5,721,825 A * | 2/1998 | Lawson | ................. | G06F 9/542 709/203 |
| 5,751,914 A * | 5/1998 | Coley | ..................... | G06F 9/542 706/47 |
| 6,185,613 B1 * | 2/2001 | Lawson | ................. | G06F 9/542 709/224 |
| 6,477,585 B1 * | 11/2002 | Cohen | ..................... | G06F 9/542 719/318 |
| 7,275,250 B1 * | 9/2007 | Novik | ..................... | G06F 9/542 707/999.103 |
| 7,451,145 B1 * | 11/2008 | Boxmeyer | ............ | H04L 43/065 |
| 7,523,137 B2 * | 4/2009 | Kass | ....................... | G06Q 10/00 |
| 7,856,415 B2 * | 12/2010 | Gatti | ................. | G06F 17/30569 707/602 |

(Continued)

OTHER PUBLICATIONS

Eugster et al., "Event Systems—How to Have Your Cake and Eat it Too", in Proceedings of the 22nd International Conference on Distributed Computing Systems Workshops (ICDCSW '02), IEEE Computer Society, 2002, 6 pages. (Year: 2002).*

(Continued)

*Primary Examiner* — Phuong Thao Cao
(74) *Attorney, Agent, or Firm* — Thomas | Horstemeyer, LLP

(57) ABSTRACT

Disclosed are various embodiments for filters and event schema for categorizing and processing streaming event data. An event may be generated by a service that describes user interaction a client application executable on a client device. The event may be received as a data structure in a first format. A filter, such as a regular expression filter, may be applied to the data structure to identify an event type for the event. The data structure may be converted from the first format to a second format in accordance with a common event schema able to be interpreted by virtual compute engines.

20 Claims, 10 Drawing Sheets

(56) References Cited

U.S. PATENT DOCUMENTS

| | | | |
|---|---|---|---|
| 8,805,861 B2 * | 8/2014 | Boyan | G06F 17/3089 707/756 |
| 8,898,218 B2 * | 11/2014 | Thompson | G06F 9/542 709/201 |
| 9,210,056 B1 * | 12/2015 | Choudhary | G06F 16/284 |
| 9,294,361 B1 * | 3/2016 | Choudhary | G06F 16/903 |
| 9,305,238 B2 * | 4/2016 | Srinivasan | G06K 9/62 |
| 9,674,124 B1 * | 6/2017 | Fisher | H04L 51/066 |
| 2002/0010804 A1 * | 1/2002 | Sanghvi | G06F 9/542 719/318 |
| 2002/0019886 A1 * | 2/2002 | Sanghvi | G06F 9/542 719/318 |
| 2002/0019945 A1 * | 2/2002 | Houston | H04L 41/0604 726/23 |
| 2002/0143857 A1 * | 10/2002 | Bidarahalli | G06F 9/542 709/203 |
| 2003/0101287 A1 * | 5/2003 | Novik | G06F 9/542 719/318 |
| 2003/0144849 A1 * | 7/2003 | Kakivaya | G06F 9/542 705/307 |
| 2003/0158700 A1 | 8/2003 | Forler et al. | |
| 2003/0172167 A1 * | 9/2003 | Judge | H04L 51/12 709/229 |
| 2003/0172292 A1 * | 9/2003 | Judge | G06F 21/554 726/23 |
| 2004/0153844 A1 * | 8/2004 | Ghose | H04L 41/064 714/42 |
| 2005/0114487 A1 * | 5/2005 | Peng | G06F 16/958 709/223 |
| 2005/0172162 A1 * | 8/2005 | Takahashi | G06F 11/0709 714/4.4 |
| 2005/0273593 A1 * | 12/2005 | Seminaro | H04L 29/06 713/151 |
| 2006/0230071 A1 * | 10/2006 | Kass | G06F 17/30539 |
| 2006/0265406 A1 | 11/2006 | Chkodrov et al. | |
| 2007/0005740 A1 * | 1/2007 | DiFalco | G06F 11/0751 709/223 |
| 2007/0011292 A1 * | 1/2007 | Fritsch | H04L 29/06 709/223 |
| 2008/0016502 A1 * | 1/2008 | Henderson | G06F 17/30893 717/143 |
| 2008/0059491 A1 * | 3/2008 | Gatti | G06F 17/30569 |
| 2008/0086363 A1 * | 4/2008 | Kass | G06Q 10/04 705/7.29 |
| 2008/0114873 A1 * | 5/2008 | Chakravarty | H04L 41/0613 709/224 |
| 2008/0148398 A1 * | 6/2008 | Mezack | G06F 21/55 726/22 |
| 2008/0294771 A1 * | 11/2008 | Hermes | G05B 23/0267 709/224 |
| 2009/0063206 A1 * | 3/2009 | Payne | G06Q 10/02 705/5 |
| 2009/0106701 A1 * | 4/2009 | Yalamanchi | G06F 16/26 715/841 |
| 2009/0265288 A1 * | 10/2009 | Chakravarty | G06N 5/022 706/11 |
| 2010/0082950 A1 * | 4/2010 | Kinzhalin | G06F 9/30101 712/227 |
| 2011/0137942 A1 * | 6/2011 | Yan | G06F 16/24568 707/780 |
| 2011/0154092 A1 | 6/2011 | Dash et al. | |
| 2011/0154367 A1 * | 6/2011 | Gutjahr | G06F 9/542 719/316 |
| 2011/0258638 A1 | 10/2011 | Davies et al. | |
| 2011/0304466 A1 * | 12/2011 | Bair, III | F25D 29/008 340/585 |
| 2012/0005152 A1 * | 1/2012 | Westen | G06F 17/3089 707/602 |
| 2012/0084399 A1 * | 4/2012 | Scharber | H04L 67/34 709/219 |
| 2012/0089868 A1 * | 4/2012 | Meijer | G06F 11/076 714/26 |
| 2012/0130843 A1 * | 5/2012 | Himmerick | G06Q 30/08 705/26.3 |
| 2012/0246200 A1 * | 9/2012 | Balasubramanian | G06F 21/552 707/809 |
| 2012/0254313 A1 * | 10/2012 | Fake | G06F 11/3068 709/204 |
| 2012/0284105 A1 * | 11/2012 | Li | G06Q 30/02 705/14.23 |
| 2012/0323941 A1 * | 12/2012 | Chkodrov | G06F 17/30516 707/756 |
| 2012/0324359 A1 * | 12/2012 | Lee | G06F 8/38 715/733 |
| 2013/0066670 A1 * | 3/2013 | Krishnan Nair | G06Q 10/06 705/7.23 |
| 2013/0132942 A1 | 5/2013 | Wang | |
| 2013/0219361 A1 * | 8/2013 | Fiebig | G06F 8/70 717/121 |
| 2013/0227596 A1 * | 8/2013 | Pettis | H04N 21/2353 725/13 |
| 2013/0254524 A1 * | 9/2013 | Snapir | G06F 9/44505 713/100 |
| 2014/0149438 A1 * | 5/2014 | Baum | G06F 17/30619 707/756 |
| 2014/0250121 A1 * | 9/2014 | Kieselbach | G06F 17/30595 707/736 |
| 2015/0106927 A1 * | 4/2015 | Ferragut | H04L 63/1416 726/23 |
| 2015/0149565 A1 * | 5/2015 | Ahmed | H04L 65/403 709/206 |
| 2015/0154249 A1 * | 6/2015 | Dave | G06Q 50/10 707/758 |
| 2015/0207871 A1 * | 7/2015 | Li | H04L 41/0604 709/223 |
| 2015/0269606 A1 * | 9/2015 | Hewett | G06Q 30/0243 705/14.42 |
| 2015/0293955 A1 * | 10/2015 | Dickey | G06F 17/30516 707/741 |
| 2015/0295766 A1 * | 10/2015 | Dickey | H04L 41/0856 709/221 |
| 2015/0295775 A1 * | 10/2015 | Dickey | H04L 41/22 715/735 |
| 2015/0295780 A1 * | 10/2015 | Hsiao | H04L 43/022 715/736 |
| 2015/0381712 A1 * | 12/2015 | de Castro Alves | G06F 16/24568 709/201 |
| 2016/0004629 A1 | 1/2016 | Bharara | |
| 2016/0004733 A1 * | 1/2016 | Cao | G06F 11/0709 707/755 |
| 2016/0026510 A1 * | 1/2016 | Furtwangler | G06F 9/466 719/318 |
| 2016/0028688 A1 * | 1/2016 | Chizhov | H04L 63/029 726/12 |
| 2016/0063080 A1 * | 3/2016 | Nano | H04L 67/12 707/602 |
| 2016/0070581 A1 | 3/2016 | Soon-Shiong | |
| 2016/0103838 A1 * | 4/2016 | Sainani | G06F 3/0488 707/725 |
| 2016/0182561 A1 * | 6/2016 | Reynolds, II | H04L 41/0686 726/1 |
| 2016/0224804 A1 * | 8/2016 | Carasso | G06F 16/2322 |
| 2017/0005886 A1 * | 1/2017 | Dade | H04L 43/065 |
| 2017/0006141 A1 * | 1/2017 | Bhadra | H04W 4/70 |
| 2017/0011527 A1 * | 1/2017 | Matsunaga | G06K 9/00342 |
| 2017/0104799 A1 | 4/2017 | Prock et al. | |
| 2017/0124569 A1 * | 5/2017 | Revelle | G06Q 20/42 |
| 2017/0155694 A1 * | 6/2017 | Pinkovezky | G06F 17/24 |
| 2017/0272306 A1 | 9/2017 | Venkataraman et al. | |
| 2017/0287475 A1 | 10/2017 | Baldwin | |
| 2017/0318074 A1 * | 11/2017 | Margatan | H04L 67/02 |
| 2017/0345277 A1 * | 11/2017 | Kurniawan | H04L 12/2803 |
| 2017/0372429 A1 | 12/2017 | La Placa | |
| 2018/0004729 A1 | 1/2018 | Qiu et al. | |

(56) References Cited

U.S. PATENT DOCUMENTS

2018/0034840 A1* 2/2018 Marquardt ........ G06F 17/30958
2018/0367623 A1* 12/2018 Fisher ................ G06Q 30/0633

OTHER PUBLICATIONS

Li et al., "PIE: Approximate Interleaving Event Matching over Sequences", 2015 IEEE 31st International Conference on Data Engineering, Apr. 13-17, 2015, Seoul, South Korea, pp. 747-758. (Year: 2015).*

Robins D. B., "Complex Event Processing", CSEP 504, University of Washington, Redmond, WA, Feb. 6, 2010, 10 pages. (Year: 2010).*

U.S. Appl. No. 15/262,752, filed Sep. 12, 2016, Non-Final Office Action dated Mar. 27, 2018.

U.S. Appl. No. 15/408,787 filed Jan. 18, 2017, Non-Final Office Action dated Apr. 4, 2019.

* cited by examiner

```
109b
{
    "event": {                                          303b
        "event_identifier": "A9578ZEF2",                            306b
        "event_type": "Shopping_Application_Purchase_Event",
        "customer_identifer": "Shopping_Application_Event",
        "timestamp": "2016-12-12 12:00PM EST",
        "service_identifier": "42A",            312b       309b
        "service_name": "Shopping Application Service",
        "misc_payload": {             315b
            ...
        }
    }
}
```

FILTERS AND EVENT SCHEMA FOR CATEGORIZING AND PROCESSING STREAMING EVENT DATA

BACKGROUND

Large-scale data processing systems such as web services and the like can produce vast amounts of log data including data generated by various end users, such as visitors of a network site and users of a mobile application. From time to time, it may be desirable to review such data to identify events of interest. For example, a marketing department may desire to identify behavioral patterns of individual users. However, the quantity of log data generated by such systems may present significant difficulties in terms of data storage and review. Querying data stores having millions to billions of entries, for example, may consume bandwidth, monopolize computing resources, and provide slow search results.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
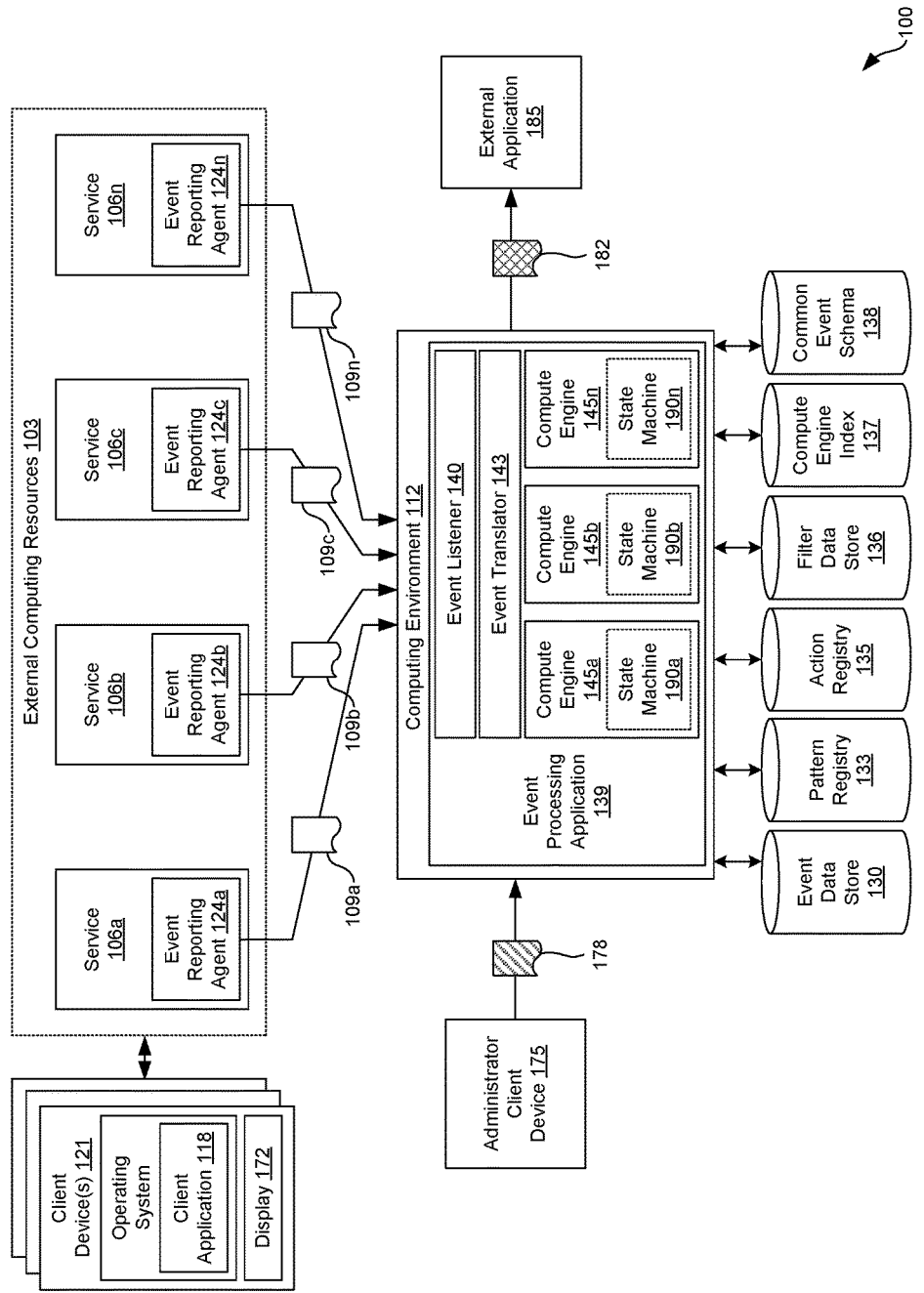
FIG. 1 is a drawing of an event monitoring system implemented as a networked environment according to various embodiments of the present disclosure.

The present disclosure relates to patterns for categorizing and processing streaming event data. More specifically, the present disclosure relates to applying a filter to classify an event and transforming events from disparate sources into a common event schema. It may be desirable to monitor user interactions with computer applications, for example, to improve customer experience, market potential goods and services to customers, drive engagement, or monitor user behavior. However, events performed by users in those computer applications, if recorded, can amass quickly in a data store, potentially totaling millions to billions of entries. The quantity of data may present significant difficulties in terms of review. For example, marketing personnel may want to analyze customer behavior with a company's software application to determine how to better market a product to a person based on their behavior. However, running queries on data stores having millions to billions of entries of user interactions may be problematic due to limitations in database processing, bandwidth, and other computing resources. Additionally, providing search results in a timely fashion may be difficult.

An event monitoring system may be provided to monitor user-generated events in real-time to identify behavioral patterns as they occur. Events may include interactions performed by a user in association with a particular application, such as a web browser, a media player, a reading application, a shopping application, or other similar type of application. To this end, events may include, for example, interacting with a user interface component, viewing a product page for a particular item in a shopping application, purchasing an item, starting playback of a movie or song in a media player, finishing a virtual novel in a book reading application, or other similar action.

Issues may arise when events are received from different sources in different data formats. For example, an order transaction system that publishes events for users that order items in a shopping application may generate events that include an order identification number, a transaction time, and a price. A video streaming system, however, may generate an event that includes a title, a critics rating, a video length and a video category. Events from the order transaction system can assume a JavaScript object notation (JSON) format while events from the video stream system assuming an extensible markup language (XML) format. As any logic that analyzes these type of events may depend on particular data fields and a format of the event, additional logic would be required to handle all possible formats of an event. Additionally, complexity of understanding disparate data formats increases as events are received from an increasing number of sources.

According to various embodiments described herein, an event translator of the event monitoring system may be employed to classify events and transform event data structures into a format desirable by a compute engine, which may comprise a virtualized computational unit that compares events to patterns, as will be discussed. In one embodiment, an event is received in a stream of events generated by disparate services, where the event describes at least one instance of user interaction with at least one client application executable on a client device. A filter is applied to the event data structure to classify the event or identify a type of the event. In some embodiments, the filter may comprise a regular expression filter. The event data structure may be transformed or converted from a first format to a second format according to a common event schema. Further, one or more compute engines requiring access to the event may be identified and the data structure in the second format can be communicated to the compute engines requiring access (referred to herein as "an interested compute engine").

In the following discussion, a general description of an event monitoring system and its components is provided, followed by a discussion of the operation of the same.

With reference to FIG. 1, shown is an event monitoring system 100 according to various embodiments of the present disclosure. The event monitoring system 100 includes external computing resources 103 that include a number of services 106a . . . 106n (collectively "services 106"), as will be described. Generally, the services 106 report events 109a . . . 109n (collectively "events 109") to a computing environment 112 for analysis. Events 109 can describe interactions with a client application 118 executable on a client device 121, as will also be described.

In one embodiment, each of the services 106 are executed on one or more servers or other hardware with like capability to serve up network data to the client device 121, as well as observe interactions with the client application 118. For example, the services 106 may serve up network pages to the client devices 121 or data used to generate user interfaces in a dedicated application. As the services 106 serve up the network data to the client devices 121, the services 106 can be configured to observe when a user manipulates a hyperlink, a button in a user interface, or performs another type of action, such as purchasing an item in an electronic commerce system, playing a movie, and so forth. As interactions are observed, the services 106 may be configured to communicate an event 109 to the computing environment 112 describing an interaction with a client application 118 as soon as it is identified, or shortly thereafter.

The services 106 may communicate events 109 to the computing environment 112 over a network that may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The tasks performed by each respective service 106, such as serving up content to client applications 118, may be independent of the tasks performed by other ones of the services 106. In this respect, each service 106 may be disconnected or independent of the other services 106. Stated another way, no one service 106 knows about the operations or tasks performed by any of the other services 106. Thus, the services 106 may operate independently of each other.

The services 106 may include event reporting agents 124a . . . 124n (collectively "event reporting agents 124"). Each of the event reporting agents 124 may include logic that operates in conjunction with a particular client application 118 or function of a client device 121 to measure user interaction. In other words, the event reporting agents 124 generate events 109 describing interactions that are transmitted to a computing environment 112 over a network. In some embodiments, the event reporting agents 124 can be executed on the client device 121, for example, as a component of the client application 118 or as a standalone application.

For a given service 106, events 109 generated by the service 106 may be in a format different from other events 109 generated by other services 106. As the services 106 operate independently, they potentially produce events 109 in a variety of disparate formats. For example, one of the services 106 may communicate events 109 in a JSON format while another one of the services 106 may communicate events 109 in an XML format. Additionally, a data structure for an event 109 may vary from one service 106 to another.

For instance, a client application 118 may include a media player application that plays media files, such as music or movies. If a user selects "play" in the media player application, an event 109 describing that interaction can be generated by the service 106 and sent to the computing environment 112 for analysis. Similarly, if the user purchases an item in a shopping application, another event 109 describing completion of a purchase can be generated by a service 106 and sent to the computing environment 112. As may be appreciated, the event 109 describing the interaction with the media player may assume a format different from that of the event 109 describing the interaction with the shopping application.

The computing environment 112 may comprise, for example, a server computer or any other system providing computing capability. Alternatively, the computing environment 112 may employ a plurality of computing devices that may be arranged, for example, in one or more server banks or computer banks or other arrangements. Such computing devices may be located in a single installation or may be distributed among many different geographical locations. For example, the computing environment 112 may include a plurality of computing devices that together may comprise a hosted computing resource, a grid computing resource and/or any other distributed computing arrangement. In some cases, the computing environment 112 may correspond to an elastic computing resource where the allotted capacity of processing, network, storage, or other computing-related resources may vary over time.

Various applications or other functionality may be executed in the computing environment 112 according to various embodiments. Also, various data is stored in data stores that are accessible to the computing environment 112. The data stores can include, for example, an event data store 130, a pattern registry 133, an action registry 135, a filter data store 136, a compute engine index 137, common event schema 138, as well as other data stores as can be appreciated. The data stores are associated with the operation of the various applications or functional entities described below.

The components executed on the computing environment 112, for example, include an event processing application 139 and other applications, services, processes, systems, engines, or functionality not discussed in detail herein. The event processing application 139 is executed to process events 109 received from the services 106, identify certain patterns of events, and perform predetermined actions when patterns of events are identified. Processing events 109 may include classifying events 109 and communicating events 109 to appropriate services such that the events 109 may be processed in a computationally efficient manner. To this end, the event processing application 139 may include an event listener 140, an event translator 143, as well as other services not discussed in detail herein.

In some embodiments, the event processing application 139 can generate compute engines 145a . . . 145n (collectively "compute engines 145") that process events 109. Compute engines 145 may include, for example, instances of a virtual machine, a thread, or similar process. In some embodiments, a compute engine 145 may be assigned to a particular user of a client device 121 or a particular user account. All events 109 associated with the user or user account, can be provided to the appropriate compute engine 145.

The event listener 140 is executed to monitor events 109 received from the services 106, classify events 109, and send events 109 to compute engines 145 requesting certain types of events 109. In some embodiments, the event listener 140 receives a stream of events 109 and stores the events 109 in a queue, buffer, or like mechanism to await processing.

The event translator 143 is executed to translate events 109 from a current format to another that a compute engine 145 is able to interpret. In one example, the event translator 143 transforms a data structure for an event 109 as received from a service 106 into a format as defined by the common event schema 138.

The client device 121 is representative of a plurality of client devices that may be coupled to a network. The client device 121 may comprise, for example, a processor-based system such as a computer system. Such a computer system may be embodied in the form of a desktop computer, a laptop computer, personal digital assistant, cellular telephone, smartphone, smartwatch, set-top box, music player, web pad, tablet computer system, game console, electronic book reader, or other devices with like capability. The client device 121 may include a display 172. The display 172 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client devices 121 may be configured to execute various applications such as a client application 118 or other applications. The client application 118 may be executed in the client device 121, for example, to access network content served up by the services 106 or other servers, thereby rendering a user interface on the display 172. To this end, the client application 118 may comprise, for example, a web browser, a dedicated application, etc., and the user interface may comprise a network page, an application screen, etc. In some embodiments, the dedicated application includes, for example, email applications, social networking applications, word processors, spreadsheets, and/or other applications. The client device 121 may be configured to execute applications beyond the client application 118.

The computing environment 112 is implemented to receive events 109 from the services 106 and to record such events 109 in the event data store 130. In doing so, the computing environment 112 may be configured to generate a timestamp of the time that the events 109 were received and may insert the timestamp as an attribute of the events 109 before they are stored in the event data store 130. In addition, the event processing application 139 may perform other operations on the events 109 before they are stored in the event data stores 130. In some embodiments, the computing environment 112 may defer to other authoritative sources to record events 109 in the event data store 130. For example, the services 106 that generate the events 109 may record events 109 in their own data stores. In such instances, the computing environment 112 may include custom data adapters that can fetch events 109 from these data sources, when required. This may reduce event storage operation at the computing environment 112 to increase computational efficiency, as may be appreciated.

The event processing application 139 may cooperate with administrator client devices 175 in order to retrieve various ones of the events 109 stored in the event data store 130 or data associated therewith. Additionally, the event processing application 139 can facilitate creation of a pattern of events. A pattern of events (hereinafter "pattern 178") may include an event 109 or collection of events 109 that an administrator may specify to measure user interaction. For instance, if an administrator desires to receive a notification when a particular user or group of users has watched five movies in a media player application, the administrator can specify a pattern 178 that detects five instances of a user having watched a movie in the media player application.

The event processing application 139 can further facilitate creation of an action 182 to be performed when all events 109 in a pattern 178 have been completed. Referring back to the example above, an administrator can specify a pattern 178 to identify users that have watched fives movies in the month of August. If the administrator desires to reward users who perform events 109 that match a pattern 178, the administrator can specify an action 182 to be performed automatically when the pattern 178 is complete. For example, users that watch five movies in the month of August can automatically be provided with a coupon to rent a new movie. The event processing application 139 may communicate with external applications 185 to cause performance of actions 182 specified by an administrator via an administrator client device 175. External applications 185 may include other servers or like computer systems.

Next, a general discussion of the operation of the various components of the event monitoring system 100 is provided. To begin, assume, for example, that an entity offers various client applications 118 for download on client devices 121 and desires to observe interactions made by users with those client applications 118. As may be appreciated, the user interactions can be beneficial in improving user interfaces, managing customer experiences, marketing potential goods and services to customers, increasing user engagement, or monitoring other types of user behavior.

As users of the client devices 121 interact with various types of client applications 118 on their respective client devices 121, the services 106 that provide data for those client applications 118 may identify what type of user interactions occur based on the type of data requested. The services 106 may communicate data pertaining to those interactions as events 109. Using events 109, the event monitoring system 100 can identify when patterns 178 occur. For instance, one user may interact with a shopping application to electronically purchase items while another user may interact with a book reader application to read a novel or magazine. An administrator may desire to monitor these interactions and identify patterns 178. Additionally, the administrator may desire the event monitoring system 100 to perform an action 182 when a pattern 178 has been identified.

The computing environment 112 may generate one or more user interfaces for access by administrator client devices 175 such that an administrator can generate a pattern 178 and an action 182 to be performed when the pattern 178 has been detected. For example, an administrator may desire to reward users with a coupon who have purchased an item in the shopping application and have watched a movie using the media player application.

When a pattern 178 has been specified, the event processing application 139 may dynamically generate compute engines 145 required to monitor users to determine when a pattern 178 of user behavior has been performed. In one embodiment, compute engines 145 are generated for each client device 121 having access to a service 106. In another embodiment, a compute engine 145 is generated for each user account associated with a service 106. As may be appreciated, the compute engines 145 may be configured to sleep or hibernate, or otherwise not consume computing resources, until an event 109 has been passed to a compute engine 145 by the event listener 140. For example, the compute engines 145 may transition into appropriate modes of operation prior to an event 109 being received.

When a compute engine 145 is generated by the event processing application 139, the compute engine 145 may be registered with the compute engine index 137. Additionally, the compute engine index 137 may retain types of events 109 for which a compute engine 145 has interest. For example, an administrator may desire to reward users who have read three books in a week with a coupon. The administrator creates a pattern 178 that seeks three events 109 that describe a user completing a book. A compute engine 145 may be generated that monitors John Doe's user interactions. However, as the pattern 178 only requires monitoring user interactions with a book reading application (e.g., to identify whether a user has read three books in a week), the compute engine 145 for John Doe should not receive events 109 unrelated to the book reading application. Accordingly, the event listener 140 may only communicate events 109 having a type for which compute engines 145 are interested.

In various embodiments, the compute engines 145 may be implemented as one or more state machines 190*a* . . . 190*n* (collectively "state machines 190"). The state machines 190 may comprise, for example, event-driven finite state machines where a transition from one state to another is triggered by an event 109 being passed to a compute engine 145 from the event listener 140. The state machines 190 may be implemented programmatically using CASE and SWITCH statements available in various programming languages. As may be appreciated, the state machines 190 may increase computational efficiency of the event monitoring system 100. The state machines 190 may also be implemented by using proprietary or customized software that natively provide finite state machine modeling.

In some embodiments, the compute engines 145 may model the pattern 178 to be matched as state machines 190 that reach a terminal state when a pattern 178 is completely matched or an event 109 is received that explicitly terminates the state machines 190. The patterns 178 in the pattern registry 133 may be instantiated as state machines 190 by a compute engine 145. When a state machine 190 reaches a halting state, the pattern 178 may be identified as being completely matched.

In one example, a first one of the services 106 may include a server that monitors user interaction with a shopping application on a client device 121 while a second of the services 106 may include a server that monitors user interaction with a book reading application. When a user of a client application 118 interacts with a respective one of the applications, the appropriate service 106 identifies the interaction and generates an event 109 describing the interaction. For example, the event 109 may identify a type of interaction performed, such as adding an item to a virtual shopping cart, completing purchase of an item, pressing play or pause on a song, finishing a movie, or flipping a page in a virtual book. The service 106 then communicates this event 109 to the computing environment 112 for analysis.

When a pattern 178 in the pattern registry 133 has been matched for a given user, e.g., when all events 109 specified in the pattern 178 have been identified in a stream of events 109 (or if the state machine 190 that the compute engine 145 is executing to match a pattern 178 reports a completed match), the action 182 to perform can be identified from the action registry 135. In one embodiment, the action 182 is communicated to an external application 185 for performance. For example, if an action 182 includes rewarding a user with a coupon to an electronic commerce system, the computing environment 112 may communicate with the electronic commerce system to cause the coupon to be provided to the user.

In further embodiments, the state machines 190 may have the ability to query data stores, such as the compute engine index 137, the event data store 130, a global data store, or other appropriate data stores, to perform event disambiguation. For example, a same event 109 may be received multiple times to the event listener 140 or the compute engine 145. To make the events 109 idempotent, the state machines 190 may query appropriate data stores to determine whether two events 109 are actually a single event 109 received multiple times. As a result, the two events 109 will not result in two matches to a pattern 178, rather a single match to the pattern 178.

Figure 2:
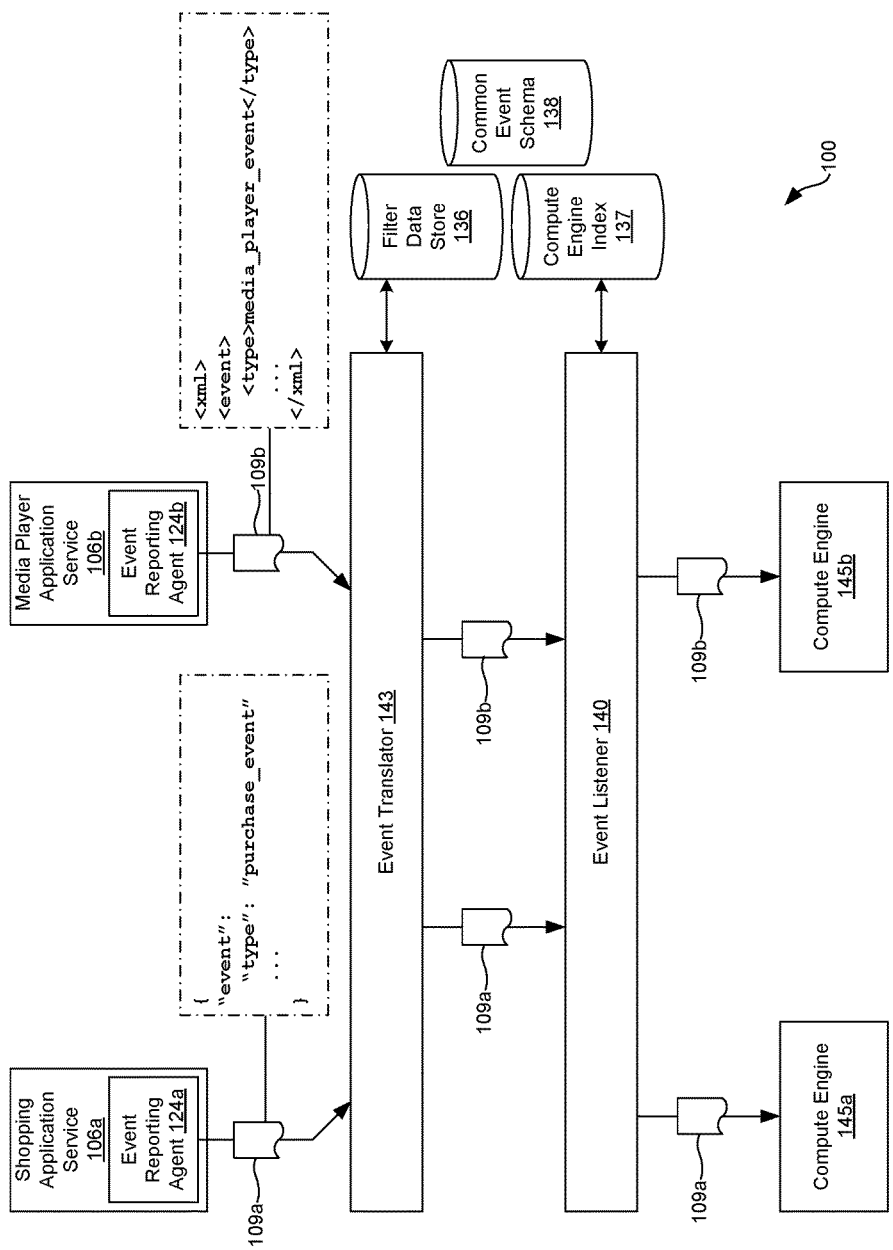
FIG. 2 is another drawing of the event monitoring system of FIG. 1 according to various embodiments of the present disclosure.

Referring next to FIG. 2, shown in another drawing of the event monitoring system 100. As noted above, each of the services 106 may be independent of another service 106. In the non-limiting example of FIG. 2, the services 106 include a shopping application service 106*a* and a media player application service 106*b*. The shopping application service 106*a*, for example, may serve up information that allows a user to purchase items through a particular type of client application 118. The media player application service 106*b* may serve up media content, such as movies, television shows, music, or other media content. Using a suitable client application 118, the user can watch the content, as may be appreciated.

Issues may arise when events 109 are received from different services 106 in different data formats. For example, the shopping application service 106*a* may generate events 109 for users that order items in a shopping application that may have unique fields, such as an order identification number, a transaction time, and a price. The media player application service 106*b*, however, may generate an event 109 that includes different fields, such as a title, a critics rating, a video length and a video category. As shown in FIG. 2, an event 109*a* generated by the shopping application service 106*a* can assume a JSON format while an event 109*b* generated by the media player application service 106*b* assumes an XML format. As the compute engines 145*a* . . . 145*b* that analyze these type of events 109 may depend on particular data fields and a format of a data structure of the event 109, additional logic would be required to handle all possible formats of an event 109.

Accordingly, the event translator 143 may be employed to classify events 109 and transform event data structures into a format desirable by the compute engines 145*a* . . . 145*b*. In some embodiments, the event translator 143 may apply filters to a data structure for an event 109, for example, to classify the event 109 or identify a type of the event 109. In some embodiments, the filter may comprise a regular expression filter. A regular expression filter may include a sequence of characters that define a search pattern. Using the search pattern, a data structure may be analyzed for one or more matches. Applying a regular expression filter may provide a lightweight and computationally efficient method of classifying an event 109, as may be appreciated.

Applying a regular expression filter may be performed programmatically, for example, in logic or source code of the event translator 143. The regular expression filter may be applied to keys, values, or a combination thereof of a data structure for an event 109 to determine a type of the event 109 or, in other words, an event type. In some embodiments, the regular expression filter may look for a desired string, substring, or integer to determine an event type. For example, the regular expression filter may look to match "title" or "director" to identify media player application events 109 (e.g., events 109 that indicate an interaction with a media player application was performed). The regular expression can include:

/^(title|director) ([a-z0-9]{2, 6}+(_*)?)+[a-z0-9]$/, or other appropriate regular expression. Thus, the regular expression filter will return a match for instances of "title" and "director" in a data structure for an event 109. The match can be used to classify the event 109 as a media player event 109. As may be appreciated, the regular expression may be modified as needed to identify key or value naming conventions applied by the services 106 when generating events 109.

Additionally, the event translator 143 may transform or convert a data structure for an event 109 from a first format to a second format according to the common event schema 138. For example, the common event schema 138 may indicate that all data structures for events 109 communicated to the compute engines 145 be in one of an XML, JSON, or other type of format. Additionally, the common event schema 138 can indicate that key values, or variable names for data fields, have a common label. After conversion, one or more compute engines 145 interested in the event 109 may be identified and the data structure in format of the common event schema 138 may be communicated to the interested compute engines 145.

Figures 3A, 3B:
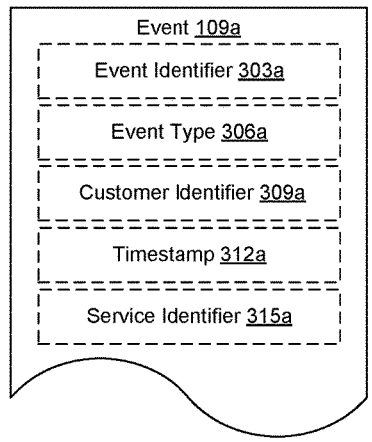
FIGS. 3A-3C are drawings showing embodiments of an event communicated in the event monitoring system of FIG. 1 according to various embodiments of the present disclosure.

Referring next to FIGS. 3A-3B, the structure of an event 109a . . . 109b communicated in the event monitoring system 100 is shown according to various embodiments. Specifically, FIG. 3A shows a schematic diagram for an event 109 while FIG. 3B shows an example JSON data structure that may be communicated over a network using hypertext transfer protocol (HTTP), hypertext transfer protocol secure (HTTPS), or other like protocol. While FIG. 3B shows a JSON data structure, other embodiments may include an XML data structure or similar data structures.

In various embodiments, an event 109 may generated by a service 106 to include an event identifier 303a . . . 303b, an event type 306a . . . 306b, a customer identifier 309a . . . 309b, a timestamp 312a . . . 312b, a service identifier 315a . . . 315b, as well as additional information pertaining to a user interaction that caused the service 106 to generate the event 109.

The event identifier 303 may include, for example, a unique identifier that can be used to query an event 109 from the event data store 130 at a later time, if desired. The event type 306 may include an identifier, label, or other description capable of identifying a type of user interaction that caused the event 109 to be generated and identifying where which compute engines 145 to which the event 109 should be routed. In some embodiments, the event type 306 may identify a type of client application 118 in which the user interaction occurred and/or the type of user interaction. For example, the event type 306 may identify that a user purchased an item in a shopping application on his or her client device 121.

The customer identifier 309 may include an identifier that uniquely identifies a user of a client device 121 or a user account associated with the client device 121. In embodiments in which compute engines 145 are generated for each user account, the customer identifier 309 can be used by the event listener 140 to route the event 109 to appropriate compute engines 145.

The timestamp 312 may include a time at which the user interaction occurred or at which the event 109 was generated by the service 106. The service identifier 315 may include an identifier, label, or other information that identifies which of the service 106 that generated and communicated the event 109 to the event processing application 129.

Figure 3C:
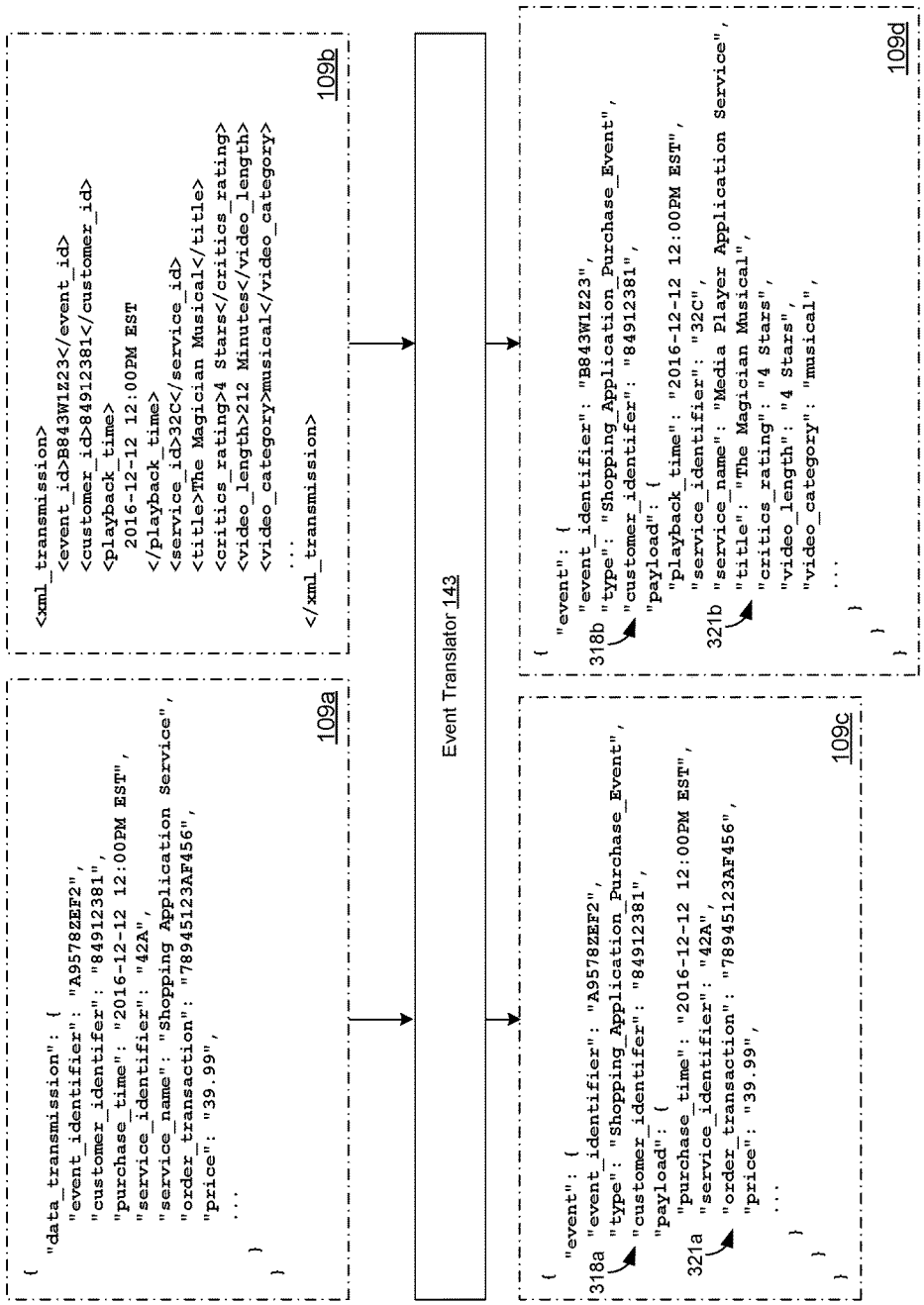

Turning now to FIG. 3C, a first event 109a and a second event 109b are shown prior to conversion by the event translator 143. For example, as the first event 109a includes information associated with a purchase order, the first event 109a may be described as originating from a shopping application service 106, or similar service 106. Similarly, as the second event 109b includes information associated with a movie, the second event 109b may be described as originating from a media player application service 106, or similar service 106.

The first event 109a is shown is a JSON format while the second event 109b is shown in an XML format. As a compute engine 145 may be interested in both events 109, the compute engine 145 would have to be configured to interpret data in both XML and JSON formats. Additionally, the compute engine 145 would have to be familiar with variable names and other information.

Accordingly, prior to communicating an event 109 to the compute engine 145, the event translator 143 may convert a data structure for an event 109 from a first format to a second format according to the common event schema 138. For example, the common event schema 138 may indicate that all data structures for events 109 communicated to the compute engines 145 be in one of an XML, JSON, or other type of format. Additionally, the common event schema 138 can indicate that key values, or variable names for data fields, have a common label.

In the non-limiting example of FIG. 3C, the first event 109a and the second event 109b are converted into a JSON data format to generate a first transformed event 109c and a second transformed event 109d. While the second event 109b originated in an XML format, it may be converted to a JSON format prior to communication to the compute engine 145. The data fields may also be restructured according to the common event schema 138. For instance, the first transformed event 109c and the second transformed event 109d may comprise uniform headers 318a . . . 318b that include, for example, an event identifier, an event type, and a customer identifier extracted from the original data structure and renamed in accordance with the common event schema 138. All information unrelated to information stored in the headers 318a . . . 318b may be stored as payloads 321a . . . 321b in the body of the data structure. In other words, the event translator 142 may select a portion of data in the data structure for the event 109 for inclusion in a header of the new data structure while placing the remaining portion of the data in the data structure for the event 109 in a body of the new data structure.

In another embodiment, the event translator 142 may select a portion of data in the data structure for the event 109 for inclusion in a header of the new data structure while placing the entire data structure for the event 109, as recited, in a body of the new data structure. After conversion, one or more compute engines 145 interested in the event 109 may be identified and the data structure in format of the common event schema 138 may be communicated to the interested compute engines 145.

Figure 4:
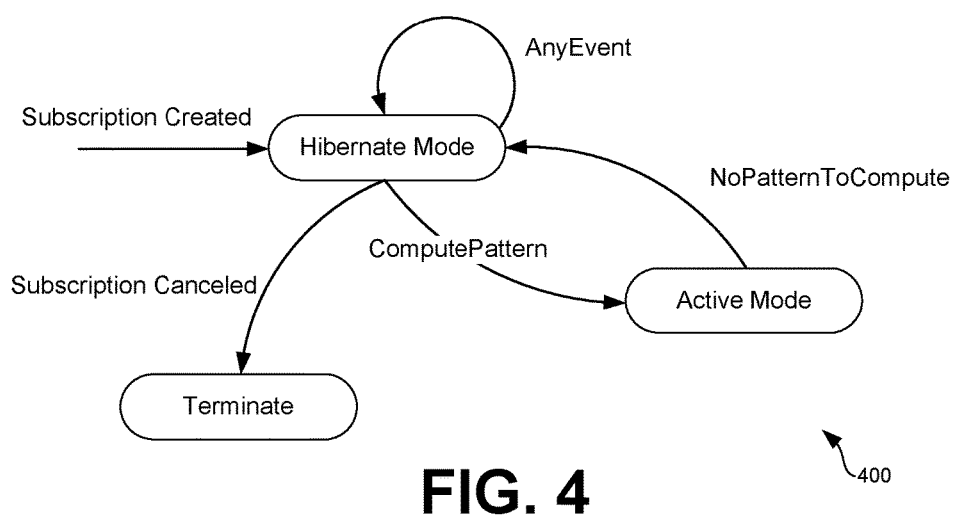
FIG. 4 is a state machine diagram for a state machine of the event monitoring system of FIG. 1 according to various embodiments of the present disclosure.

Referring next to FIG. 4, shown is a state machine diagram 400 that shows example functionality of a compute engine 145 implementing an event-driven finite state machine 190 in the event monitoring system 100. In various embodiments, a compute engine 145 may be generated for a user that attempts to identify one or more patterns 178 in a user lifecycle. For example, a user may create an account with a subscription with an electronic commerce system, purchase various items over an amount of time, and eventually terminate his or her subscription. Administrators may desire to specify patterns 178 for compute engines 145 to match while the user is subscribed to the service. The compute engine 145 generated by the event processing application 139 may monitor a given user's lifecycle following the state machine diagram 400 shown in FIG. 4.

For example, the event processing application 139 can generate a compute engine 145 for a user account when a subscription is created. After creation, the compute engine 145 may assume a sleep or hibernate mode where the compute engine 145 does not actively consume computational resources. Once a pattern 178 applicable to the user is created by an administrator, an active mode is enabled where state machines 190 are spawned by the compute engine 148 to process events 109 received by the compute engine 145 and match patterns 178. After computing one or more events 109 and/or matching one or more patterns, if no patterns 178 require analysis by the compute engine 145, the compute engine 145 may assume the sleep or hibernate mode until another pattern 178 applicable for the user (and the compute engine 150) is created. This may continue until the user cancels his or her subscription. Thereafter, the compute engine 145 may terminate execution to free up memory or other computer resources.

In some embodiments, while a compute engine 145 operates in either the hibernate mode or the active mode, the compute engine 145 may be configured to monitor for additional patterns 178 to process. For example, while in the hibernate mode, the compute engine 145 may query the pattern registry 133 once every three hours, or other predetermined amount of time, to check for new patterns 178. If any new patterns 178 are identified, the state of the compute engine 145 would transition to the active mode, where events 109 from the event listener 140 may be processed. In some embodiments, the compute engine 145 includes a virtual machine or a thread in a parallel computing resource. In further embodiments, the compute engines 145 may be implemented in a master-slave threaded computing environment.

Figure 5:
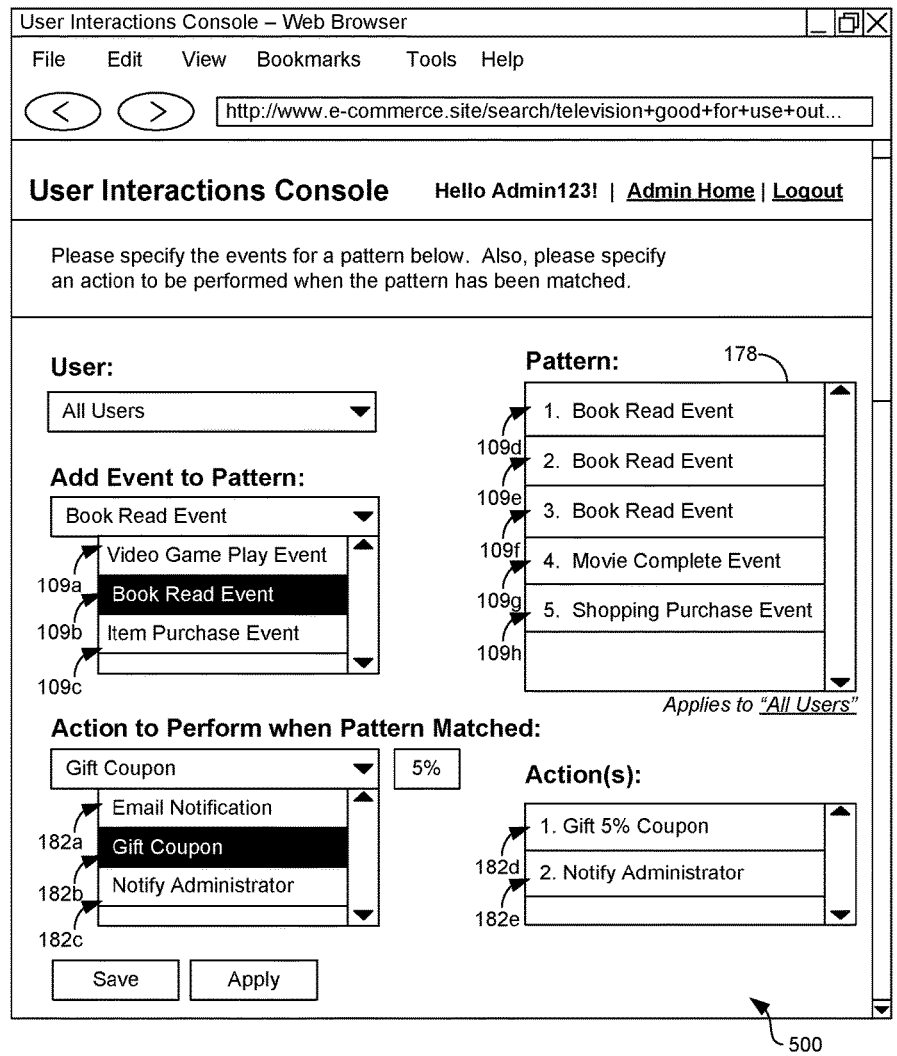
FIG. 5 is an example user interface rendered by an administrator client device in the event monitoring system of FIG. 1 according to various embodiments of the present disclosure.

Turning now to FIG. 5, shown is an example user interface 500 capable of being rendered by an administrator client device 175 to specify a pattern 178 and one or more actions 182a . . . 182e to be performed when a pattern 178 has been matched. For example, the administrator can specify a user or group of users for whom a pattern 178 should be applied. To this end, any compute engines 145 monitoring any of the specified users will be notified of the pattern 178 and may match events 109a . . . 109h to the pattern 178. In the example of FIG. 5, the pattern 178 may include three book read events 109d . . . 109f, a movie complete event 109g, and a shopping purchase event 109h. When the pattern 178 is matched, the 5% gift coupon action 182d and the notify administrator actions 182e may be performed by the event processing application 139, or other appropriate application or service.

Figure 6:
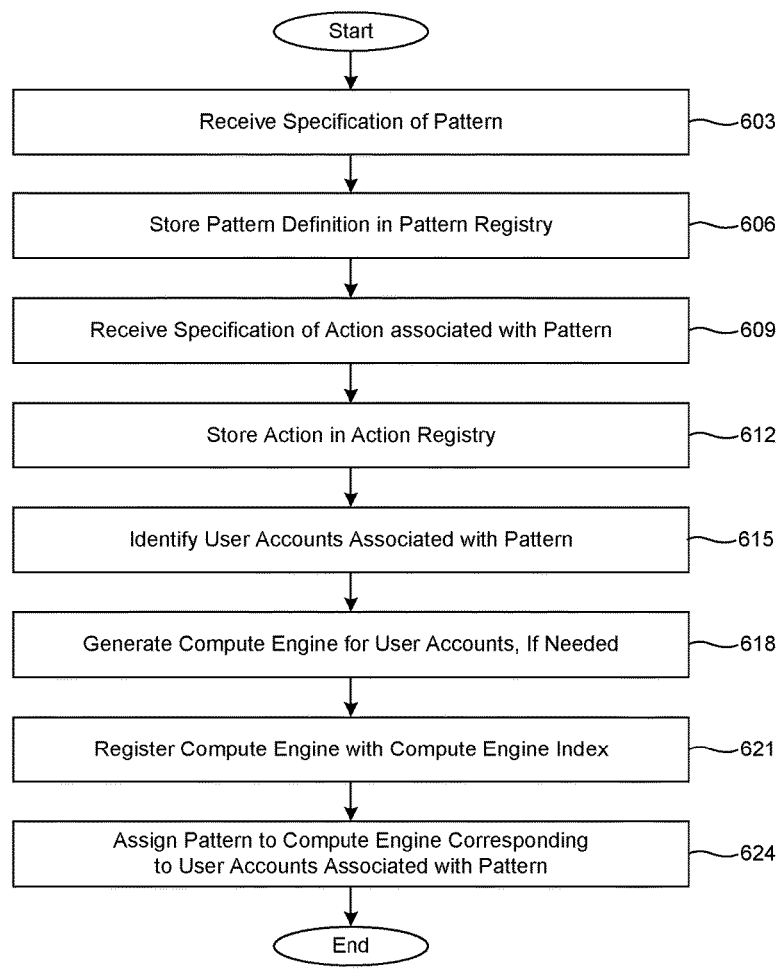
FIG. 6 is a flowchart illustrating functionality implemented by an event processing application executed in a computing environment of the event processing system of FIG. 1 according to various embodiments of the present disclosure.

Referring next to FIG. 6, shown is a flowchart that provides one example of the operation of the event processing application 139 according to various embodiments. It is understood that the flowchart of FIG. 6 provides merely an example of the many different types of functional arrangements that may be employed to implement the operation of the event processing application 139 as described herein. As an alternative, the flowchart of FIG. 6 may be viewed as depicting an example of elements of a method implemented in the computing environment 112 according to one or more embodiments.

Beginning with 603, a pattern 178 is specified by an administrator. For example, the event processing application 139 can serve up user interface data to generate a user interface 500 similar to the one shown in FIG. 5. By selecting appropriate components in the user interface 500, the administrator can specify a pattern 178 and an action 182 to be performed when the pattern 178 is completed for any applicable users. The pattern 178 specified by the administrator can be received from the administrator client device 175, as may be appreciated.

Next, in 606, the pattern 178 may be stored in the pattern registry 133 or other suitable data store. As a compute engine 145 may execute for a particular user account, the compute engine 145 may access the pattern registry 133 to identify patterns 178 for the particular user account. In 609, a specification of an action 182 to be performed when the pattern 178 is completed may also be received from the administrator client device 175. In 612, the action 182 is stored in the action registry 135 or other suitable data store for later access.

Next, in 615, any user account subject to the pattern 178 may be identified. In 618, a compute engine 145 may be generated for each of the user accounts subject to the pattern 178, if needed. In some scenarios, a compute engine 145 may already exist for a particular user account. In these situations, the compute engine 145 may not need be generated and 618 may be skipped or omitted. In 621, the compute engines 145 generated in 621 may be registered with the compute engine index 137. This may include specifying that the compute engine 145 is interested in particular types of events 109. The event listener 140 may use the compute engine index 137 to communicate events 109 to interested compute engines 145, as opposed to sending all events 109 to all compute engines 145. In 624, the pattern 178 may be assigned to the compute engines 145 corresponding to the user accounts associated with the pattern 178, such as those identified in 615. Thereafter, the process may proceed to completion.

Figure 7:
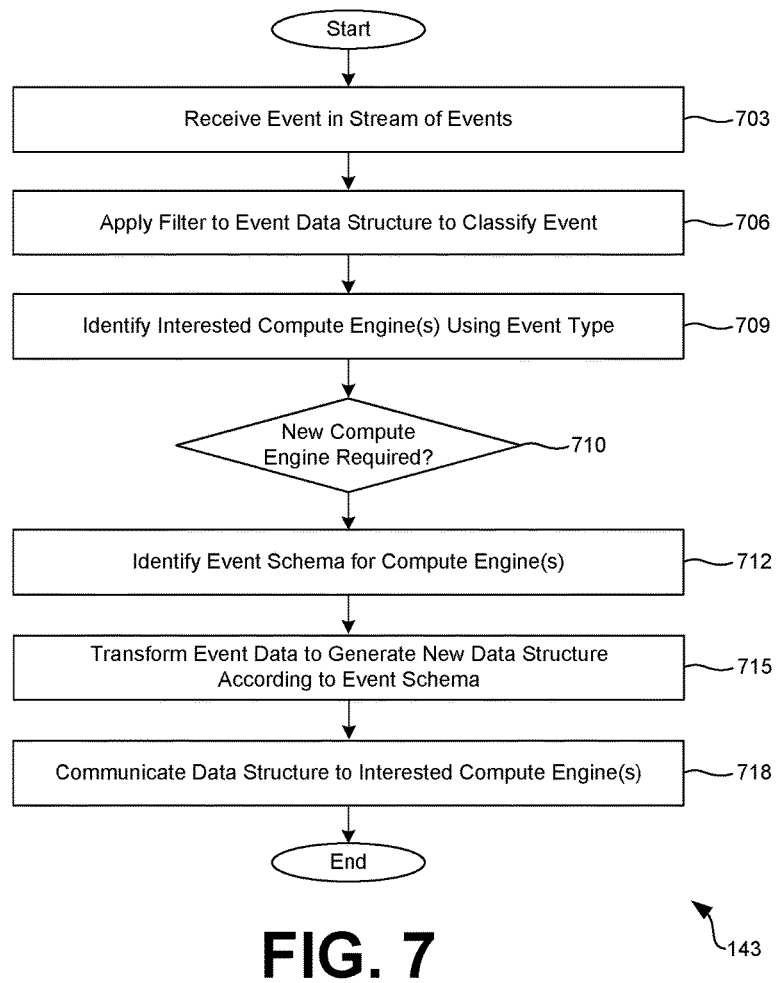
FIG. 7 is a flowchart illustrating functionality implemented by an event translator executed in the computing environment in of event processing system of FIG. 1 according to various embodiments of the present disclosure.

Referring next to FIG. 7, shown is a flowchart that provides one example of the operation of the event translator 143 according to various embodiments. It is understood that the flowchart of FIG. 7 provides merely an example of the many different types of functional arrangements that may be employed to implement the operation of the event translator 143 as described herein. As an alternative, the flowchart of FIG. 7 may be viewed as depicting an example of elements of a method implemented in the computing environment 112 according to one or more embodiments.

Beginning with 703, the event translator 143 may identify an event 109 received in a data stream generated by one of the services 106 as a user interacts with a client application 118. In some embodiments, the services 106 may execute in external computing resources 103 where the services 106 communicate events 109 over a network to the computing environment 112 in no particular order. The event translator 143 may obtain the event 109 from a buffer or queue where the event 109 is stored when received from a service 106.

Next, in 706, the event listener 140 may apply a filter to a data structure for the event 109 (the "event data structure") to classify the event 109. Classifying the event 109 may include, for example, determining a type for the event 109. For example, the type of the event 109 may describe an interaction performed by a user, such as selecting or manipulating a component of a user interface 500, adding an item to a virtual shopping cart, completing purchase of an item, pressing play or pause on a song, finishing a movie, or flipping a page in a virtual book.

In some embodiments, the filter may include a regular expression filter. The regular expression filter may be applied to keys, values, or a combination thereof of the event data structure to determine a type for the event 109. In some embodiments, the regular expression filter may look for a desired string, substring, or integer to determine a type for an event 109. For example, the regular expression filter may look to match "purchas" (root for "purchase" or "purchasing") or "order" to identify purchase events 109 (e.g., events 109 that indicate an item was purchased in a shopping application). The regular expression may include:

/^(purchas|order) ([a-z0-9]{2, 6}+(_*)?)+[a-z0-9] $/, or other suitable regular expression. Thus, the regular expression filter will return a match for instances of "purchase," "purchasing," and "order" in a data structure for an event 109. The match can be used to classify the event 109 as a purchase event. As may be appreciated, the regular expression can be modified as needed to identify key or value naming conventions applied by the services 106 when generating events 109.

In further embodiments, the regular expression filter applied to classify an event 109 may be selected from the filter data store 136. In one example, a filter may be stored in the filter data store 136 in association with one or more services 106. When interpreting an event 109 originating for a particular service 106, a filter corresponding to the service 106 may be employed. To this end, the event translator 143 may identify a suitable filter from potential filters stored in the filter data store 136.

As may be appreciated, the filter may be a determinative factor for determining a type for an event 109. However, in additional embodiments, a type for an event 109 may be determined based at least in part on a service 106 that generated the event 109, a type of user interaction that prompted generation of the event 109, a type of client application 118 in which the user interaction was identified, the regular expression filter, or other suitable information.

Next, in 709, the compute engine index 137 may be queried to identify compute engines 145 interested in, or requiring access to, the type of the event 109 and/or a customer account associated with the event 109. For example, if the event 109 is identified as a purchase event performed in a shopping application, all compute engines 145 interested in purchase events can be identified.

As the event 109 may eventually be communicated or otherwise made available to the interested compute engines 145 for analysis, in some scenarios, it is beneficial to transform a data structure into one able of interpretation by logic of a compute engine 145. In one embodiment, a common event schema 138 is applied to all events 109 being communicated to compute engines 145. In other embodiments, each compute engine 145 may be associated with an event schema such that all events 109 provided to the compute engine 145 are transformed to comply with the event schema. Additionally, in some situations, a pattern 178 requires matching against events 109 received from services 106; however, an interested compute engine 145 does not exist or has not been generated. Hence, in 710, a determination may be made whether a new compute engine 145 is required. For example, an administrator may define a new pattern 178 and, when an event 109 is received, a compute engine 145 is generated dynamically to match patterns 178 interested in the event 109.

In 712, an event schema is identified for the interested compute engines 145 and, in 715, the data structure for the event 109 is transformed to create a data structure in accordance with the event schema. In other words, the data structure of the event 109 as received from a service 106 is converted from a first format to a second format according to the common event schema 317 or other event schema. In 718, the data structure in the second format is communicated to the interested compute engines 145 for processing.

Figure 8:
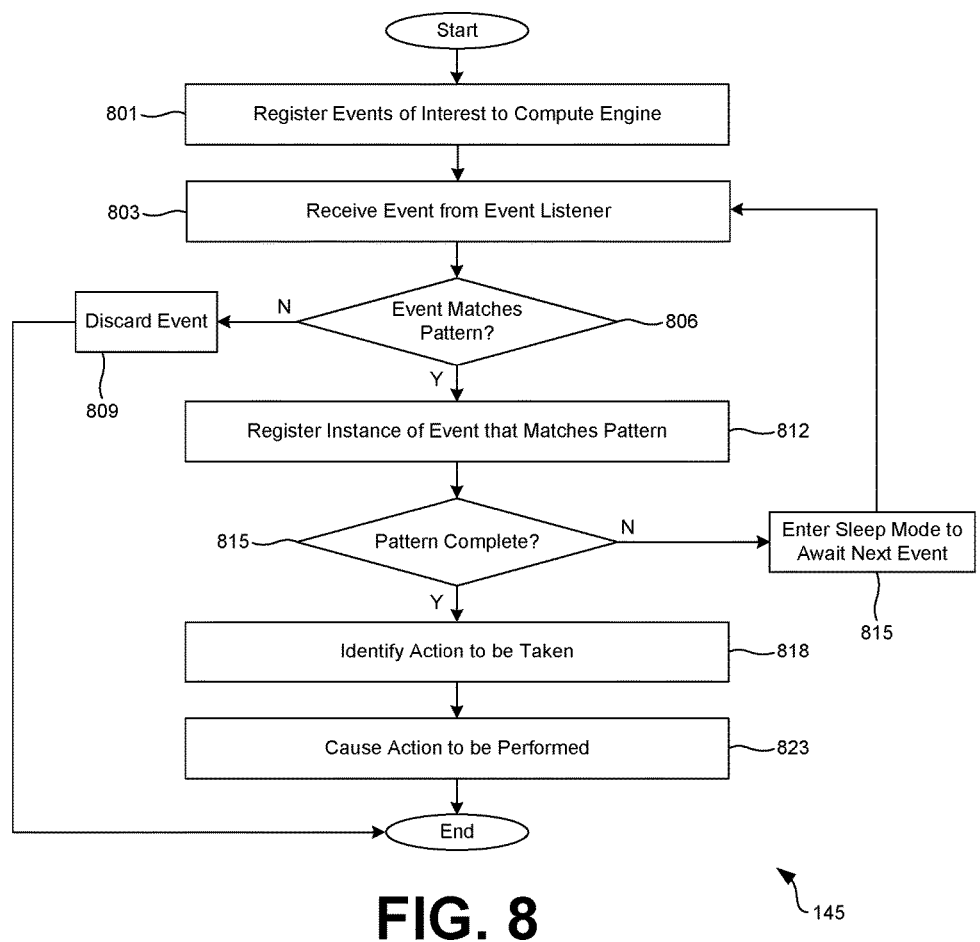
FIG. 8 is a flowchart illustrating functionality implemented by a compute engine executed in the computing environment of the event processing system of FIG. 1 according to various embodiments of the present disclosure.

Turning now to FIG. 8, shown is a flowchart that provides one example of the operation of the compute engine 145 according to various embodiments. It is understood that the flowchart of FIG. 8 provides merely an example of the many different types of functional arrangements that may be employed to implement the operation of the compute engine 145 as described herein. As an alternative, the flowchart of FIG. 8 may be viewed as depicting an example of elements of a method implemented in the computing environment 112 according to one or more embodiments.

Beginning with 803, a compute engine 145 may receive an event 109 from the event listener 140. Next, in 806, the compute engine 145 may determine whether the event 109 matches a pattern 178. As the compute engine 145 may execute for a given user or user account, the compute engine 145 may identify all patterns 178 associated with the user and may determine whether the event 109 matches an event 109 in the one or more patterns 178. If the event 109 received does not match events 109 in the pattern 178, or no pattern 178 exists, the process can proceed to 809 where the event 109 is discarded. Thereafter, the process can proceed to completion.

Referring back to 806, if, however, the event 109 matches a pattern 178, the process can proceed to 812 where the instance of the event 109 matching an event 109 in the pattern 178 is registered in an appropriate data store. In some embodiments, instances of an event 109 matching a pattern 178 are stored in the compute engine index 137 or, in other embodiments, the instances of an event 109 matching a pattern 178 are archived, logged, or otherwise stored in a data store (e.g., an off-line data store) for analytical analysis of the matching instances at a later time.

Next, in 815, the compute engine 145 determines whether the pattern 178 has been complete. In other words, the compute engine 145 determines whether all events 109 included in a pattern 178 have been matched. If the pattern 178 is not complete, the process may proceed to 815 where the compute engine 145 enters into a sleep or hibernation mode to await receipt of the next event 109. Thereafter, the process may revert to 803.

Referring back to 815, if the pattern 178 is complete, the process can proceed to 818 where an action 182 associated with the pattern 178 is identified. This may include, for example, querying the action registry 135 to identify an action 182 corresponding to the pattern 178 having been completed. Next, in 821, the action 182 is performed. In some embodiments, the compute engine 145 may perform the action 182. In other embodiments, the event processing application 139 may perform the action 182 or the action 182 may be communicated to an external application 185 for performance. In further embodiments, when a pattern 178 has been completely matched with events 109, the pattern 178 and associated events 109 and actions 182 may be stored in an off-line data store for archival purposes as well as to free memory in the event data store 130, pattern registry 133, action registry 136, or other data store. Thereafter, the process may proceed to completion.

Figure 9:
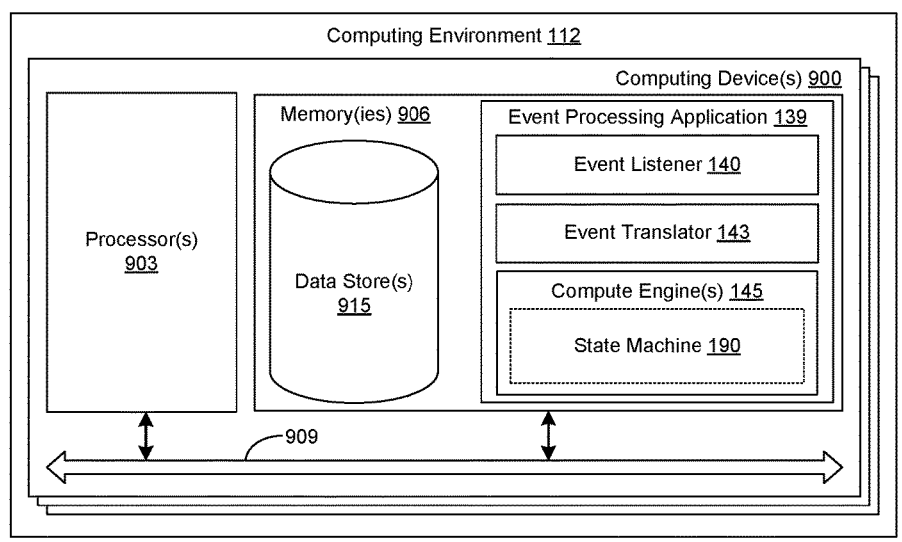
FIG. 9 is a schematic block diagram illustrating of a computing environment employed in the event processing system of FIG. 1 according to various embodiments of the present disclosure.

With reference to FIG. 9, shown is a schematic block diagram of the computing environment 112 according to an embodiment of the present disclosure. The computing environment 112 includes one or more computing devices 900. Each computing device 900 includes at least one processor circuit, for example, having a processor 903 and a memory 906, both of which are coupled to a local interface 909. To this end, each computing device 900 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 are the event processing application 139, the event listener 140, the event translator 143, the compute engines 145, the state machine 190, and potentially other applications. Also stored in the memory 906 may be a data store 915 and other data. The data store 915 may include, for example, the event data store 130, the pattern registry 133, the action registry 135, and the compute engine index 137. In addition, an operating system may be stored in the memory 906 and executable by the processor 903.

It is understood that there may be other applications that are stored in the memory 906 and are executable by the processor 903 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and/or multiple processor cores and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the event processing application 139, the event listener 140, the event translator 143, the compute engine(s) 145, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6, 7, and 8 show the functionality and operation of an implementation of portions of the event processing application 139, the event listener 140, and the compute engine(s) 145. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowcharts of FIGS. 6, 7, and 8 show a specific order of execution, it is understood that the order of execution may differ from that which is depicted. For example, the order of execution of two or more blocks may be scrambled relative to the order shown. Also, two or more blocks shown in succession in FIGS. 6, 7, and 8 may be executed concurrently or with partial concurrence. Further, in some embodiments, one or more of the blocks shown in FIGS. 6, 7, and 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the event processing application 139, the event translator 143, and the compute engine(s) 145, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the event processing application 139, the event translator 143, and the compute engines 145, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 900, or in multiple computing devices in the same computing environment 112. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code executable in at least one computing device that, when executed, directs the at least one computing device to:

receive a specification of a pattern of events and an action to be performed in association with the pattern of events from an administrator device;

access an event received in a stream of events generated by a plurality of services, wherein the event describes at least one instance of user interaction with at least one client application executed on a client device, the event being received as a data structure in a first format;

identify a source of the event from the services based at least in part on a service identifier;

identify a regular expression filter from a plurality of potential regular expression filters stored in a data store, the regular expression filter being identified from the data store based at least in part on the source;

apply the regular expression filter to the data structure in the first format to identify an event type for the event;

identify a compute engine interested in the event, the compute engine identified based at least in part on the event type;

transform the data structure from the first format to a second format in accordance with a common event schema interpretable by the compute engine interested in the event; and communicate the data structure in the second format to the compute engine, the compute engine being a virtual computing process configured to:
  compare the event to the pattern of events; and
  in response to all events in the pattern of events being matched, cause the action to be performed.

2. The non-transitory computer-readable medium of claim 1, wherein transforming the data structure from the first format to the second format comprises converting the data structure from an extensible markup language (XML) format to a JavaScript object notation (JSON) format.

3. The non-transitory computer-readable medium of claim 1, wherein transforming the data structure from the first format to the second format comprises converting the data structure from a JavaScript object notation (JSON) format to an extensible markup language (XML) format.

4. The non-transitory computer-readable medium of claim 1, wherein:

the compute engine is generated in response to a receipt of the specification of the pattern of events and the action; and the compute engine is generated to correspond to an account associated with the pattern of events.

5. A system, comprising:

at least one computing device; and program instructions executable in the at least one computing device that, when executed by the at least one computing device, cause the at least one computing device to:

receive a specification of a pattern of events and an action to be performed in association with the pattern of events from an administrator device;

access an event received in a stream of events generated by a plurality of services, wherein the event describes at least one instance of user interaction with at least one client application executed on a client device;

identify a regular expression filter from a plurality of potential regular expression filters stored in a data store, the regular expression filter being identified from the data store based at least in part on a source of the event;

apply the regular expression filter to at least a portion of the event to classify the event;
identify a compute engine interested in the event, the compute engine identified based at least in part on the event being classified using the regular expression filter; and
communicate the event to the compute engine interested in the event as classified, wherein the compute engine comprises a virtual computing process configured to:
compare the event to the pattern of events; and
in response to all events in the pattern of events being matched, cause the action to be performed.

6. The system of claim 5, wherein the event is received as a data structure in a first format.

7. The system of claim 6, further comprising program instructions executable in the at least one computing device that, when executed by the at least one computing device, cause the at least one computing device to transform the data structure from the first format to a second format.

8. The system of claim 7, wherein transforming the data structure from the first format to the second format further comprises:
identifying a common event schema from a data store, the common event schema interpretable by the compute engine; and
generating a new data structure in the second format in accordance with the common event schema.

9. The system of claim 8, wherein generating the new data structure in the second format in accordance with the common event schema further comprises:
selecting a first portion of data accessed from the data structure for inclusion in a header of the new data structure; and
placing a second portion of data accessed from the data structure in a body of the new data structure.

10. The system of claim 5, wherein the compute engine is a virtual machine executed in the at least one computing device or a thread processed in the at least one computing device.

11. The system of claim 5, wherein:
the event is one of a plurality of events; and
individual ones of the services comprise an event reporting agent configured to generate the events.

12. The system of claim 5, wherein:
the compute engine is generated in response to a receipt of the specification of the pattern of events and the action; and
the compute engine is generated to correspond to an account associated with the pattern of events.

13. A method, comprising:
receiving, by at least one computing device comprising at least one hardware processor, a specification of a pattern of events and an action to be performed in association with the pattern of events from an administrator device;
receiving, by the at least one computing device, an event in a data stream generated by a plurality of services, wherein the event describes at least one instance of user interaction with at least one client application executed on a client device, the event being received as a data structure in a first format;
identifying, by the at least one computing device, a regular expression filter from a plurality of potential regular expression filters stored in a data store, the regular expression filter being identified from the data store based at least in part on a source of the event;
applying, by the at least one computing device, the regular expression filter to the data structure in the first format to identify an event type for the event;
accessing, by the at least one computing device, a common event schema associated with a plurality of virtual compute engines configured to process the event;
transforming, by the at least one computing device, the data structure from the first format to a second format based at least in part on the common event schema;
identifying, by the at least one computing device, at least one of the virtual compute engines interested in the event based at least in part on the event type of the event; and
communicating, by the at least one computing device, the data structure in the second format to the at least one of the virtual compute engines, wherein the at least one of the virtual compute engines comprises a virtual computing process configured to:
compare the event to the pattern of events; and
in response to all events in the pattern of events being matched, cause the action to be performed.

14. The method of claim 13, further comprising:
identifying, by the at least one computing device, the source of the event from the services based at least in part on a service identifier, wherein the regular expression filter is identified from the plurality of potential regular expression filters stored in the data store based at least in part on the service identifier.

15. The method of claim 13, wherein individual ones of the virtual compute engines comprise a virtual machine executed in the at least one computing device or a thread processed in the at least one computing device.

16. The method of claim 14, further comprising:
generating, by the at least one computing device, the at least one of the virtual compute engines; and
registering, by the at least one computing device, the at least one of the virtual compute engines in a compute engine index in association with at least one interested event type.

17. The method of claim 16, wherein the at least one of the virtual compute engines interested in the event is identified by querying, by the at least one computing device, the compute engine index to identify the at least one of the virtual compute engines associated with the at least one interested event type.

18. The method of claim 17, wherein the at least one interested event type is a same type of event as the event type identified for the event.

19. The method of claim 13, wherein transforming the data structure from the first format to the second format based at least in part on the common event schema comprises converting the data structure from a JavaScript object notation (JSON) format to an extensible markup language (XML) format.

20. The method of claim 13, further comprising generating, by the at least one computing device, the at least one of the virtual compute engines in response to a receipt of the specification of the pattern of events and the action, wherein the at least one of the virtual compute engines is generated to correspond to an account associated with the pattern of events.

* * * * *